United States Patent
Zhang et al.

(10) Patent No.: US 9,927,985 B2
(45) Date of Patent: Mar. 27, 2018

(54) METHOD OF DYNAMIC TABLE JOURNALING

(71) Applicant: SK Hynix Inc., Gyeonggi-do (KR)

(72) Inventors: Fan Zhang, Fremont, CA (US); Yu Cai, San Jose, CA (US)

(73) Assignee: SK Hynix Inc., Gyeonggi-do (KR)

( * ) Notice: Subject to any disclaimer, the term of this patent is extended or adjusted under 35 U.S.C. 154(b) by 111 days.

(21) Appl. No.: 15/167,738

(22) Filed: May 27, 2016

(65) Prior Publication Data

US 2017/0242584 A1    Aug. 24, 2017

Related U.S. Application Data

(60) Provisional application No. 62/296,946, filed on Feb. 18, 2016.

(51) Int. Cl.
*G06F 3/06* (2006.01)
*G06F 12/02* (2006.01)

(52) U.S. Cl.
CPC ............ *G06F 3/061* (2013.01); *G06F 3/0659* (2013.01); *G06F 3/0688* (2013.01); *G06F 12/0246* (2013.01); *G06F 2212/7201* (2013.01)

(58) Field of Classification Search
CPC ......... G06F 12/0246; G06F 2212/7201; G06F 3/0688; G06F 3/0659; G06F 3/061
See application file for complete search history.

(56) References Cited

U.S. PATENT DOCUMENTS

| | | | |
|---|---|---|---|
| 2010/0169710 A1 | 7/2010 | Royer, Jr. | |
| 2012/0054419 A1* | 3/2012 | Chen | G06F 11/1441 711/103 |
| 2014/0082261 A1* | 3/2014 | Cohen | G11C 16/06 711/103 |
| 2014/0325117 A1 | 10/2014 | Canepa | |
| 2015/0193315 A1* | 7/2015 | Cheong | G06F 11/1451 714/15 |

OTHER PUBLICATIONS

Jin Ren et al., Titled, "I-CASH: Intelligently Coupled Array of SSD and HDD," In Proceedings of the 17th International Conference on High-Performance Computer Architecture (HPCA 2011), San Antonio, Texas, USA, Feb. 12-16 2011, 12 pages.

Philippe Bonnet et al., Titled, "Flash Device Support for Database Management" In Proceedings of the 5th Biennial Conference on Innovative Data Systems Research (CIDR 2011), Asilomar, CA, USA, Jan. 9-12, 2011, 16 pages.

Stephen Baumann et al,. Titled, "Flashing Databases: Expectations and Limitations" In Proceedings of the 6th International Workshop on Data Management on New Hardware (DaMoN 2010), Indianapolis, Indiana , Jun. 7, 2010, 10 pages.

(Continued)

*Primary Examiner* — Hashem Farrokh
(74) *Attorney, Agent, or Firm* — Kilpatrick Townsend & Stockton LLP

(57) ABSTRACT

Embodiments of the disclosure are directed to a journaling scheme in a flash memory device. Advantageously, embodiments described can be used to keep the rebuild time of a Flash Translation Layer (FTL) mapping table to a maximum upon restart from a sudden power-loss event.

22 Claims, 11 Drawing Sheets

(56) References Cited

OTHER PUBLICATIONS

Sang-Won Lee et al. Titled, "Advances in flash memory SSD technology for enterprise database applications" In Proceedings of the ACM SIGMOD International Conference on Management of Data (SIGMOD 2009), Providence, Rhode Island, USA, Jun. 29-Jul. 2, 2009, 8 pages.

Dongzhe Ma et al., Titled, "LazyFTL: A Page-level Flash Translation Layer Optimized for NAND Flash Memory," In Proceedings of the ACM SIGMOD International Conference on Management of Data (SIGMOD 2011), Athens, Greece, Jun. 12-16, 2011, 12 pages.

Feng Chen et al., Titled, "CAFTL:A Content-Aware Flash Translation Layer Enhancing the Lifespan of Flash Memory based Solid State Drives," In Proceedings of the 9th USENIX Conference on File and Storage Technologies (FAST 2011), San Jose, CA, USA, Feb. 15-17, 2011, 14 pages.

Li-Pin Chang et al., Titled, "A low-cost wear-leveling algorithm for block-mapping solid-state disks," In Proceedings of the ACM SIGPLAN/SIGBED 2011 conference on Languages, compilers, and tools for embedded systems (LCTES 2011), Chicago, Illinois, USA, Apr. 11-14, 2011, 10 pages.

Dongchul Park et al., Titled, "A Workload-Aware Adaptive Hybrid Flash Translation Layer with an Efficient Strategy, " In Proceedings of the 19th Annual IEEE/ACM International Symposium on Modeling, Analysis and Simulation of Computer and Telecommunication Systems (MASCOTS 2011),Singapore, Jul. 25-27, 2011, 8 pages.

Yi Wang et al., Titled "RNFTL:a reuse-aware NAND flash translation layer for flash memory," In Proceedings of the ACM SIGPLAN/SIGBED 2010 conference on Languages, compilers, and tools for embedded systems (LCTES 2010), Stockholm, Sweden, Apr. 13-15, 2010, 10 pages.

Aayush Gupta et al., Titled "DFTL:a flash translation layer employing demand-based selective caching of page-level address mappings, " In Proceedings of the 14th International Conference on Architectural Support for Programming Languages and Operating Systems (ASPLOS 2009), Washington, DC, USA, Mar. 7-11, 2009, 12 pages.

Hyun-Jin Choi et al., Titled "JFTL: A Flash Translation Layer Based on a Journal Remapping for Flash Memory," ACM Transactions on Storage (TOS), vol. 4, No. 4, Jan. 2009, 22 pages.

Youngjae Kim et al., Titled "HybridStore:A Cost-Efficient, High-Performance Storage System Combining SSDs and HDDs," In Proceedings of the 19th Annual IEEE/ACM International Symposium on Modeling, Analysis and Simulation of Computer and Telecommunication Systems (MASCOTS 2011), Singapore, Jul. 25-27, 2011, 10 pages.

Biplob Debnath et al., Titled "Flashstore: High throughput persistent key-value store," In Proceedings of the 36th International Conference on Very Large Data Bases (VLDB2010), Singapore, Sep. 13-17, 2010: (Proceedings of the VLDB Endowment, vol. 3, No. 2, 2010), 12 pages.

Yi-Reun Kim et al. Titled "Page-Differential Logging an Efficient and DBMS-independent Approach for Storing Data into Flash Memory, " In Proceedings of the ACM SIGMOD International Conference on Management of Data (SIGMOD 2010), Indianapolis, Indiana, USA, Jun. 6-10, 2010, 37 pages.

Adrian M. Caulfield et al. Titled "Gordon:using flash memory to build fast, power-efficient clusters for data-intensive applications," In Proceedings of the 14th International Conference on Architectural Support for Programming Languages and Operating Systems (ASPLOS 2009), Washington, DC, USA, Mar. 7-11, 2009, 12 pages.

Xiaojian Wu et al. Titled "Managing storage space in a flash and disk hybrid storage system," In Proceedings of the 17th Annual Meeting of the IEEE/ACM International Symposium on Modelling, Analysis and Simulation of Computer and Telecommunication Systems (MASCOTS 2009), South Kensington Campus, Imperial College London, Sep. 21-23, 2009, 9 pages.

Philip A. Bernstein et al. Titled "Hyder—A Transactional Record Manager for Shared Flash" In Proceedings of the 5th Biennial Conference on Innovative Data Systems Research (CIDR 2011), Asilomar, CA, USA, Jan. 9-12, 2011, 12 pages.

Bishwaranjan Bhattacharjee et al. Titled "Enhancing Recovery Using an SSD Buffer Pool Extension," In Proceedings of the 7th International Workshop on Data Management on New Hardware (DaMoN 2011), Athens, Greece, Jun. 13, 2011, 7 pages.

Shimin Chen, Titled "FlashLogging:Exploiting Flash Devices for Synchronous Logging Performance," In Proceedings of the ACM SIGMOD International Conference on Management of Data (SIGMOD 2009), Providence, Rhode Island, USA, Jun. 29-Jul. 2, 2009, 14 pages.

Feng Chen et al. Titled "Essential Roles of Exploiting Internal Parallelism of Flash Memory based Solid State Drives in High-Speed Data Processing," In Proceedings of the 17th International Conference on High-Performance Computer Architecture (HPCA 2011), San Antonio, Texas, USA, Feb. 12-16, 2011, 12 pages.

Luc Bouganim et al. Titled "uFLIP: Understanding Flash IO Patterns," In Proceedings of the 4th Biennial Conference on Innovative Data Systems Research (CIDR 2009), Asilomar, CA, USA, Jan. 4-7, 2009, 8 pages.

Feng Chen et al. Titled "Understanding Intrinsic Characteristics and System Implications of Flash Memory based Solid State Drives," In Proceedings of the 11th International Joint Conference on Measurement and Modeling of Computer Systems (SIGMETRICS/Performance 2009), Seattle, WA, USA, Jun. 15-19, 2009, 12 pages.

Tilted "Data integrity in the event of abnormal power failure in SSDS," Innodisk Power Secure Technology for SSDs An Innodisk White Paper, Aug. 2013, 6 pages.

Chi Zhang, Titled, "Deterministic crash recovery for NAND flash based storage systems," 2014 51st ACM/EDAC/IEEE Design Automation Conference, Jun. 1-5, 2014, New York, NY.

* cited by examiner

METHOD OF DYNAMIC TABLE JOURNALING

CROSS-REFERENCES TO RELATED APPLICATIONS

The present application claims priority to Provisional Application No. 62/296,946, entitled "METHOD OF DYNAMIC TABLE JOURNALING," filed Feb. 18, 2016, which is assigned to the assignee hereof and expressly incorporated by reference herein in its entirety.

FIELD

The present invention relates generally to systems, methods and apparatus for storage devices, and specifically to improving performance of non-volatile memory devices upon start up.

BACKGROUND

Non-volatile memory devices such as Solid State Drives (SSDs) are finding new applications in consumer electronics. For example, they are replacing Hard Disk Drives (HDDs), which typically comprise rapidly rotating disks (platters). Non-volatile memories, sometimes referred to as 'flash memories' or 'flash memory devices' (for example, NAND and NOR flash memory devices), are used in media storage, cameras, mobile phones, mobile computers, laptop computers, USB flash drives, etc. Non-volatile memory provides a relatively reliable, compact, cost-effective, and easily accessible method of storing data when the power is off.

Flash memory controllers are used to manage the data stored in the non-volatile memory, and to act as an interface between a host and the non-volatile memory. A flash memory controller can include firmware that can include a Flash Translation Layer (FTL) that maps the host side logical addresses to the flash memory side "physical addresses" which correspond to physical locations. The mapping between the logical addresses and the physical addresses can change during operating of the system for various reasons including flash management. During operation, the FTL may maintain the tables that enable the translation in volatile memory, such as Dynamic Random Accessible Memory (DRAM), inside or accessible to the controller.

SUMMARY

Embodiments of the disclosure pertain to systems, methods, and computer-readable instructions that can be used in conjunction with a flash memory device. According to some embodiments, disclosed methods can be used during operation of a flash memory device to ensure that rebuild time upon startup of the flash memory device following a power-loss event can be limited to a specification requirement. However, disclosed methods, systems, and computer-readable instructions are not limited to any single application.

According to some embodiments, a non-volatile memory (NVM) controller is configured to receive a command from a host device. Upon receiving the command, the controller updates an estimated rebuild time. The estimated rebuild time is associated with rebuilding a logical-address-to-physical-address mapping table on restart from an event. The updated estimated rebuild time is based on at least a copy time associated with copying information stored in a second logical-address-to-physical-address mapping table to the logical-address-to-physical-address mapping table, and a replay time of a plurality of commands where the plurality of commands includes the command. The controller is further configured to determine that the updated estimated rebuild time exceeds a threshold value, and based on the determination, trigger a journaling event. The journaling event updates a portion of the second logical-address-to-physical address mapping table. The controller is further configured to reduce the updated estimated rebuild time based on the journaling event.

In some embodiments, the reduction in the estimated rebuild time corresponds to the replay time of a journal interval following the restart from the event. In some embodiments, the controller can be further configured to determine that the reduced updated estimated rebuild time is below the threshold value.

In some embodiments, the logical-address-to-physical-address mapping table and the second logical-address-to-physical-address mapping table are associated with a flash translation layer. In some embodiments, the plurality of commands can comprise a plurality of trim commands.

In some implementations, the second logical-address-to-physical-address mapping table is located in a non-volatile memory. In some embodiments, the rebuilding is further based on physical to logical mapping data in the non-volatile memory and the rebuilding is further based on recovery data in a system area of the non-volatile memory. In some embodiments, the event is a sudden power loss event.

In some embodiments, the logical-address-to-physical-address mapping table is located in a volatile memory accessible to the non-volatile memory. In some embodiments, the portion of the second logical-address-to-physical address mapping table updated by the journaling event is a segment of the second logical-address-to-physical-address mapping table.

In some embodiments, the threshold value is related to the maximum permissible rebuild time to meet a specification.

DETAILED DESCRIPTION OF THE INVENTION

Figure 1:
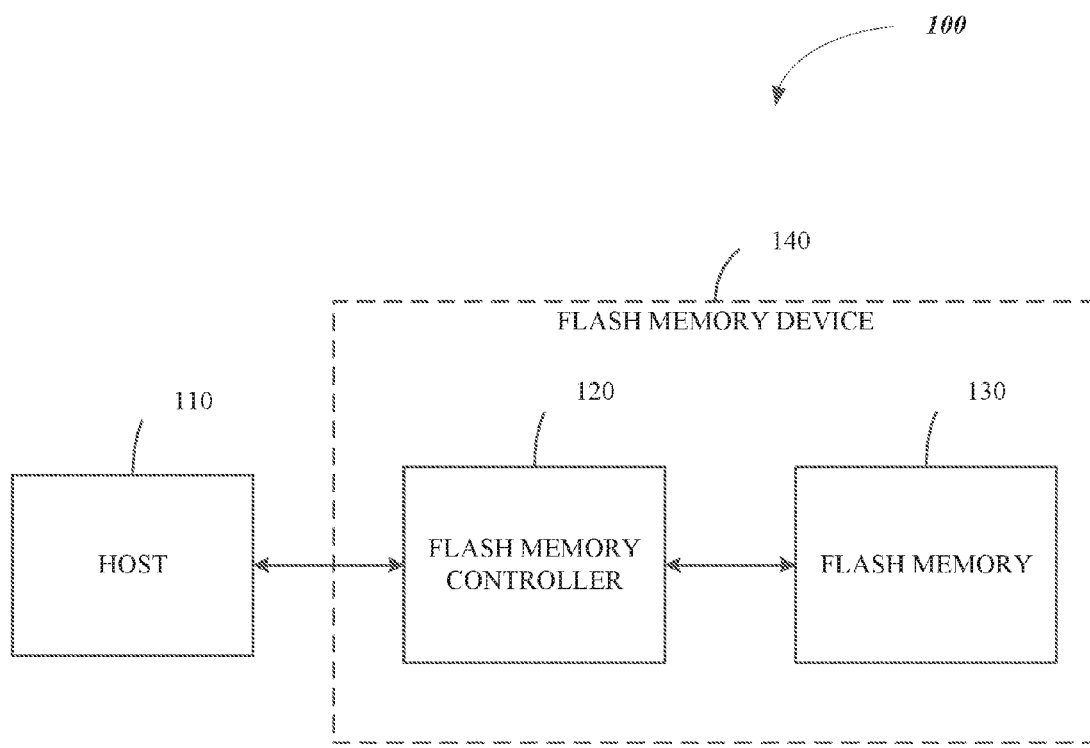
FIG. 1 is a block diagram illustrating a system including a host, a controller, and a non-volatile memory according to embodiments.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments. However, it will be apparent that various embodiments may be practiced without these specific details. The figures and description are not intended to be restrictive.

The ensuing description provides examples, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

The following detailed description together with the accompanying drawings in which the same reference numerals are sometimes used in multiple figures to designate similar or identical structures structural elements, provide a better understanding of the nature and advantages of the present invention.

Methods, systems, and computer-readable media as described in the disclosure can be used, for example, in a NAND flash memory device.

The embodiments disclosed herein are not to be limited in scope by the specific embodiments described herein. Various modifications of the embodiments of the present invention, in addition to those described herein, will be apparent to those of ordinary skill in the art from the foregoing description and accompanying drawings. Further, although some of the embodiments of the present invention have been described in the context of a particular implementation in a particular environment for a particular purpose, those of ordinary skill in the art will recognize that its usefulness is not limited thereto and that the embodiments of the present invention can be beneficially implemented in any number of environments for any number of purposes.

In a flash memory device, the Flash Translation Layer (FTL) can maintain, in an accessible volatile memory, a logical-address-to-physical-address (L2P) mapping table that is continually updated as commands are received from a host. Upon sudden power loss, however, an up-to-date version of this L2P mapping table may not be written to the non-volatile memory because there may not be sufficient power or energy to do so. Hence, on restart of the flash memory device from sudden power loss, the L2P mapping table in the volatile memory is rebuilt. However, under existing methods, rebuilding this L2P mapping table from an outdated L2P mapping table in the non-volatile memory may take an indeterminate amount of time. This may not be acceptable because several situations can require the flash memory device to be ready to accept host commands upon restart within a certain allowable amount of time.

In some embodiments disclosed, journaling schemes are described. One advantage of the methods and systems described below is that the estimated rebuild time of an L2P mapping table upon restart of a flash memory device can be limited to an arbitrary maximum value. In some embodiments, this can be achieved by continually tracking and updating an 'estimated rebuild time upon restart' even when the flash memory device is normally operational.

In a Solid State Drive (SSD), such as those based on flash memory, a Flash Translation Layer (FTL) can be used to keep track of the physical addresses corresponding to logical addresses (e.g. Logical Block Address (LBA)). In examples, this tracking can be done by a logical-address-to-physical-address mapping table (L2P mapping table) which forms part of the FTL.

The L2P mapping table, maintained by the FTL, can be present in a volatile memory accessible to a controller and updated as the controller interacts with a host. Some version, often an outdated version, of the L2P mapping table can also be present in the non-volatile memory and occupy a portion (e.g. 1/1000) of the drive capacity. According to some embodiments of the disclosure, the L2P mapping table in the volatile memory can continually update the L2P mapping table of the non-volatile memory through a process referred to as 'journaling'. However, the L2P table of the non-volatile memory may not contain the most updated version of the L2P table of the volatile memory because of lags in the journaling process that are explained further below.

Following a power loss event during operation, there may not be sufficient time or energy to write a completely updated L2P mapping table to the non-volatile memory for use at next power on. At next power-on, the question of how to recover the up-to-date table information can be referred to as the SPOR (sudden-power-off recovery) problem.

To help the controller rebuild an updated mapping table to supersede a 'dirty' mapping table (the 'dirty' mapping table referring to an outdated L2P table last saved in the non-volatile memory), another type of mapping can be stored as metadata in blocks of the non-volatile memory itself. This is a Physical to Logical (P2L) mapping, also hereafter referred to as a P2L mapping table(s) to distinguish it from the L2P mapping tables. P2L mapping tables can be stored in the non-volatile memory, and used by the controller in conjunction with the 'dirty' L2P mapping table to build an updated L2P mapping table. In some examples, such P2L tables can be stored in metapages in the same blocks where corresponding data are stored. A P2L table can be used to look up logical addresses of physical addresses. In such a table, physical address can be used as an index, and a logical address can be looked up in the content.

At SPOR, following restart, the dirty L2P mapping table is read into the volatile memory, and both host write information and trim information corresponding to the outdated portions of the dirty table are replayed. This replay can be slow as it can involve a random access of the volatile memory (e.g. Dynamic Random Access Memory, DRAM). In several situations, there can be a requirement on the maximum amount of time, herein denoted by $T_{max}$, before the flash memory device is ready to serve host commands. In some examples, such a maximum can be based on a specification or on customer requirements. Hence, the updated L2P mapping table would have to be available in the volatile memory within this maximum time to meet the specification requirements. The time spent on rebuilding an updated L2P mapping table in the volatile memory can depend on how much host write information and trim information is replayed from P2L mapping information in the non-volatile memory upon restart. Several methods, not described in detail here, can be used to distinguish P2L write information from trim information.

FIG. 1 is a simplified block diagram illustrating a system 100 including a host 110, a flash memory controller 120, and a flash memory 130, according to embodiments. In some implementations, flash memory 130 can be a NAND flash. In other implementations, non-volatile memory 130 can be a NOR flash memory configured to interact externally as a NAND flash. Flash memory 130 can be designed to store data in the absence of a continuous or substantially continuous external power supply. In some examples, flash memory 130 can be used for secondary data storage, for example, in a computer system such as a laptop. In such examples, a flash memory device 140 can replace a magnetic hard disk drive (HDD). In some examples, flash memory controller 120 can be external to flash memory device 140. In some such examples, flash memory controller 120 can interact with a plurality of flash memories. The architecture and organization of one example flash memory are provided later in the specification. In some embodiments, other non-volatile memory can be used in place of or in addition to flash memory 130. Examples can include read only memory (ROM), a mask ROM (MROM), a programmable ROM (PROM), an erasable programmable ROM (EPROM), an electrically erasable programmable ROM (EEPROM), Ferroelectric RAM (F-RAM), Magnetoresistive RAM (RAM), polymer-based organic memory, holographic memory, phase change memory and the like.

Host 110 can include any appropriate hardware device, software application, or a combination of hardware and software. In some embodiments, host 110 can include a host-side controller (not shown). In embodiments, controller 120 can interface between host 110 and non-volatile memory 130. Controller 120 can be configured to receive various commands from host 110 and interface with non-volatile memory 130 based on these commands. Controller 120 can enable flash memory 130 to perform various operations based on control signals received from host 110. In examples, this can enable host 110 to program, erase, read, or trim parts of flash memory 130.

In some embodiments, in addition to or instead of an internal volatile memory, controller 120 can interface with an external volatile memory. For example, controller 120 can have access to an external DRAM where data can be stored before being transferred to a non-volatile memory.

Over time, host 110 can perform operations such as issue write commands or invalidation commands to flash memory 130 through flash memory controller 120. Invalidation commands (e.g. delete or trim) and write commands can target logical addresses (e.g. LBAs) or set of logical addresses of flash memory 130. An example architecture of flash memory 130 is provided below with reference to FIG. 7. Invalidation commands can be intended to mark the data stored at these LBAs as invalid, and can be tracked in addition to write commands for various reasons. For example, data read from invalid locations may be required to be a pre-determined pattern (e.g. all 0s) for various reasons such as security. In example approaches, flash memory controller 120 can help store LBAs of write and invalid locations in flash memory 130 itself, in meta pages. This information, stored in meta pages as P2L mapping tables, can be used to build or rebuild an L2P mapping table.

Figure 2:
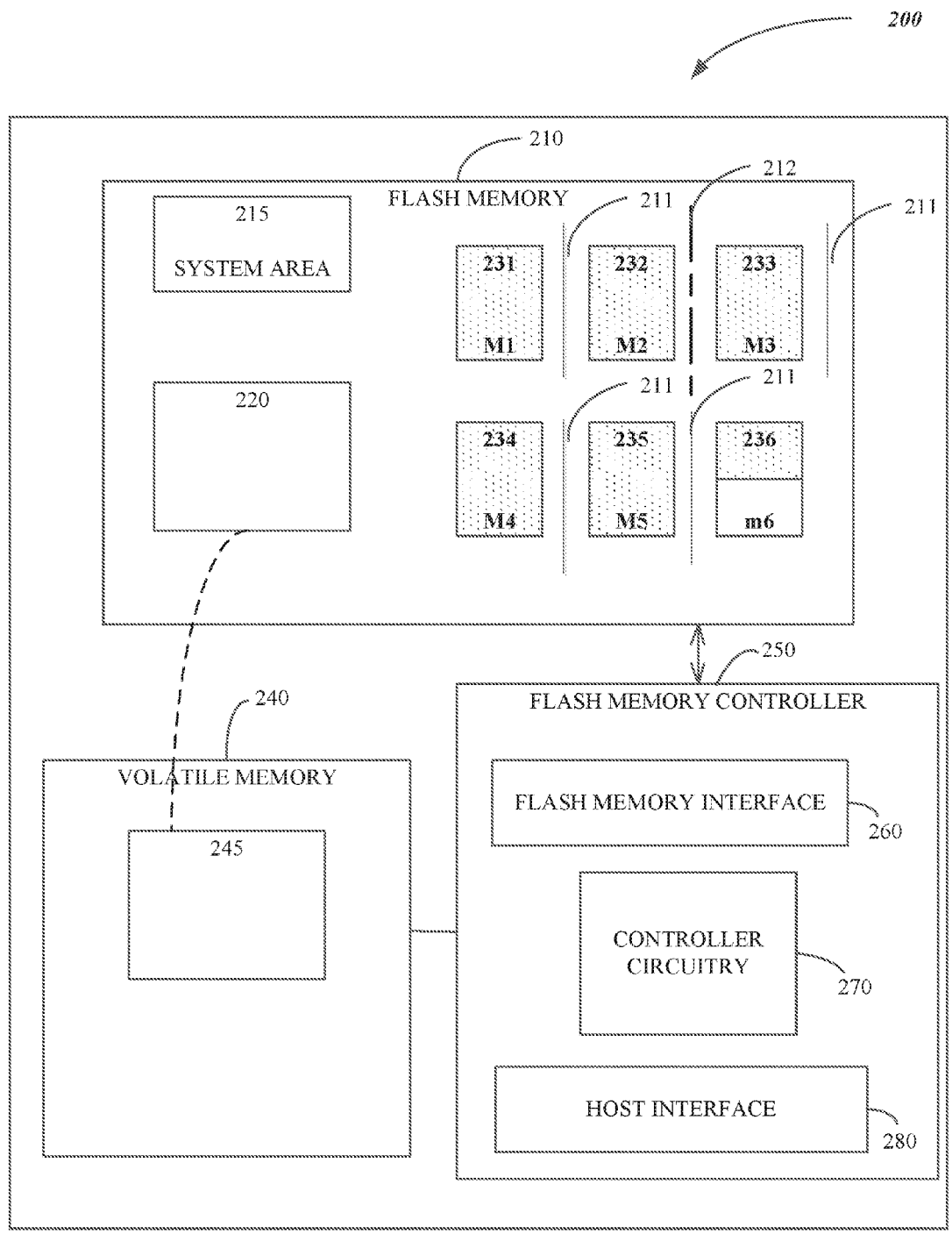
FIG. 2 is a simplified block diagram illustrating a flash memory device according to some embodiments.

FIG. 2 is a simplified block diagram illustrating a flash memory device 200 according to some embodiments. As shown in FIG. 2, flash memory device 200 includes a flash memory 210. In some embodiments, flash memory 210 can be a NAND flash memory, i.e., one based on NAND flash architecture. In some embodiments, flash memory 210 can include a plurality of N-level cells, each N-level cell storing N bits of data. Flash memory 210 can also include a system area 215. In some embodiments, system area 215 can be used to store data in open blocks upon sudden loss of power to flash memory device 200. In examples, charge stored in a super-capacitor can be used to copy or move data in open blocks to system area 215 upon loss of power.

As shown in FIG. 2, flash memory 210 can include a second logical-address-to-physical-address mapping table ("second L2P mapping table") 220, and a plurality of blocks such as blocks 231, 232, 233, 234, 235, and 236. One or more of the plurality of blocks can be partially or fully filled with data. Additionally, blocks 231, 232, 233, 234, 235, and 236, as shown, also comprise metadata M1, M2, M3, M4, M5, and m6 respectively. As the instant shown in FIG. 2, for example a power-loss event, data operations on blocks 231-235 have been complete They can be referred to as 'closed' blocks. Block 236 is an open block, with partial metadata m6 recorded at the time of power loss.

Flash memory device 200 can also include a flash memory controller 250. In examples, flash memory controller 250 can include controller circuitry 270, a host interface 280, and a flash memory interface 260. Flash memory interface 260 can include elements (e.g., hardware, software, firmware or any combination thereof) necessary for supporting a flash memory interface protocol.

Controller circuitry 270 can refer to any processing logic, including but not limited to a processor or processing core associated with a processor, Application Specific Integrated Circuit (ASIC), Field Programmable Gate Array (FPGA), or any other circuitry configurable to execute instructions.

Host interface 280 can be used to communicate with a host, such as host 110 of FIG. 1. Host interface 280 can include elements (e.g., hardware, software, firmware or any combination thereof) necessary for supporting a host interface protocol.

As shown in FIG. 2, flash memory device 200 can further include a volatile memory 240. In embodiments, volatile memory 240 can include a DRAM, a Double Data Rate DRAM (DDR DRAM), a Static RAM (SRAM), and/or other volatile memory. In general, the volatile memory can refer to any memory media where the stored data is lost in the absence of continuous or substantially continuous power supply. Volatile memory 240 includes a logical-address-to-physical-address mapping table ("L2P mapping table") 245. L2P mapping table 245 is updated as controller 250 receives commands from a host.

According to embodiments, controller circuitry 270 can be configured to interact with volatile memory 240 and flash memory 210 to update second L2P mapping table 220 based on L2P mapping table 245 through journaling events. In implementations, second L2P mapping table 220 and L2P mapping table 245 can be divided into a number of segments (e.g. n). Periodically, for example, every time 'x' blocks of data are written to the plurality of blocks in flash memory 210, one segment of L2P mapping table 245 can be journalled (i.e. updated) to second L2P mapping table 220.

Figure 3:
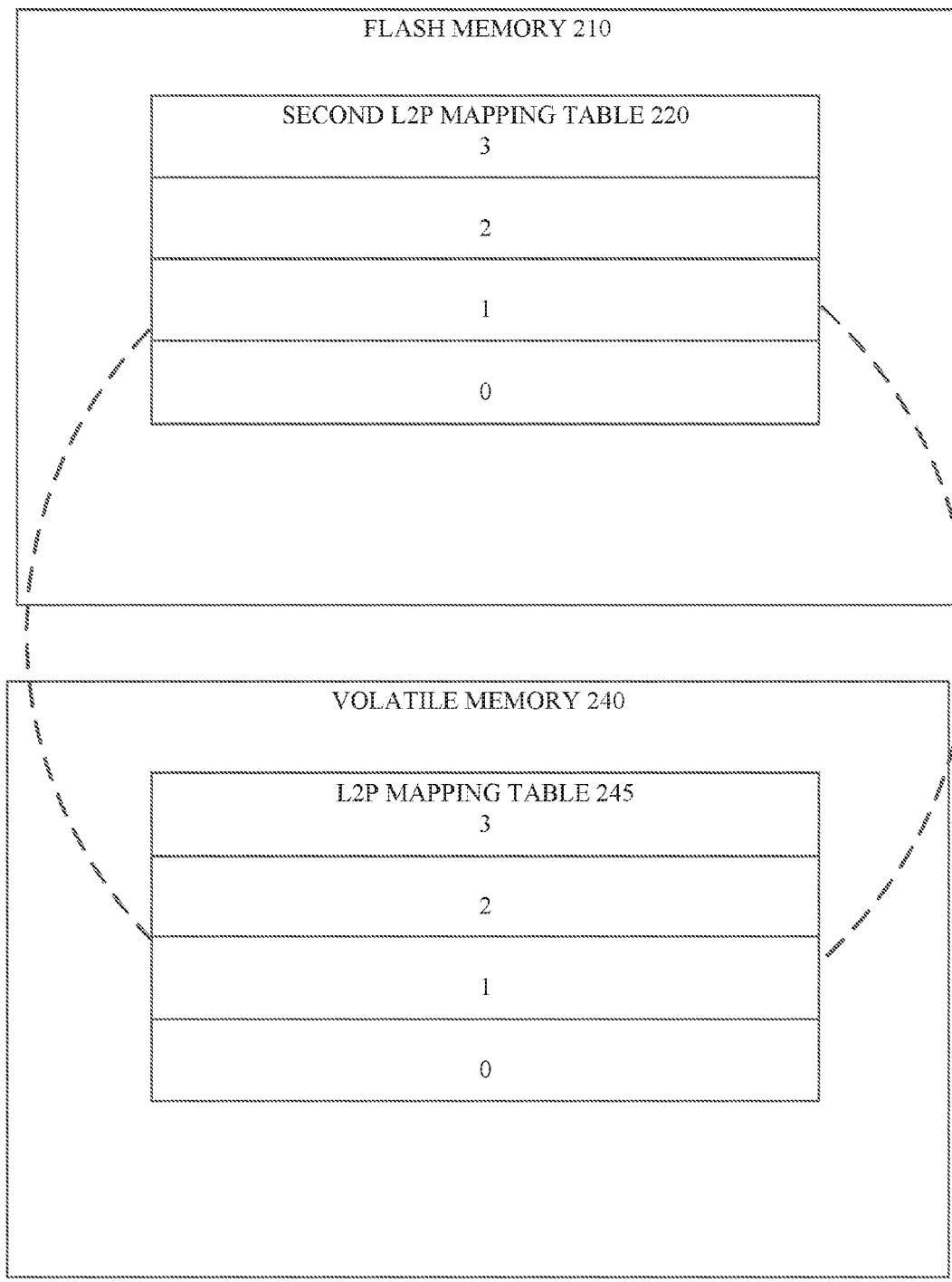
FIG. 3 is a simplified illustration of example logical-address-to-physical-address mapping tables in the flash memory and in the volatile memory, according to embodiments.

An example of the division of second L2P mapping table 220 resident in flash memory 210, and L2P mapping table 245 resident in volatile memory 240, into segments as part of the journaling process is illustrated in FIG. 3. In the example shown in FIG. 3, L2P mapping table 245 and second L2P mapping table 220 are divided into four segments (labelled 0-3). However, embodiments are not limited to such a number, and in general, the mapping tables can be divided into 'n' segments.

In some embodiments, a journaling event can occur every time 'x' blocks of the plurality of blocks of FIG. 2 are written and/or closed. A journaling event results in one segment of L2P mapping table 245 being updated to the corresponding segment of second L2P mapping table 220. For example, upon closing of a block and writing of P2L information corresponding to that block in a meta-page of that block, segment 0 of L2P mapping table 245 is updated to segment 0 of second L2P mapping table 220. Because second L2P mapping table 220 is located in flash memory 210, and because there can be several restrictions on in-place updates in flash memory 210, updating segment 0 of second L2P mapping table 220 can involve additional write operations. It should be noted that, after a journaling event, not all updated information from L2P mapping table 245 is reflected in second L2P mapping table 220. For example, following a segment 0 journaling event, segments 1, 2, and 3 of second mapping table 220 may not yet contain up-to-date data.

Now, an example of the journaling process will be described for x=1 with reference to flash memory device 200 of FIG. 2, mapping tables of FIG. 3, and timeline 400 of FIG. 4. One skilled in the art will be able to appreciate that x=1 has been chosen for simplicity in illustration and not intended to limit scope of the disclosure in any way.

At a point in time before the state shown in FIG. 2, the plurality of blocks 231-236 of flash memory 210 are empty. When block 231 is written and closed, metadata M1 corresponding to block 231 is written to block 231. At this point, L2P mapping table 245 is up-to-date (and may always be up-to-date), reflecting write and invalidation commands received from the host. However, second L2P mapping table 220 can be out-of-date. Closing of block 231 also triggers a journaling event (journaling events are triggered for every 1-block write in this example). Journaling events are indicated by lines 211 after every block write. Lines 211 and 212 are only schematic, used to indicate progress through a block when a journaling event occurs, are not meant to indicate physical partitions of blocks. Segment 0 of second L2P mapping table 220 is updated with data from segment 0 of L2P mapping table 245. It is to be noted that segments 1-3 of second L2P mapping table 220 are not up-to-date with mapping information from block 231 (metadata M1) at this point. Indeed, it would take three more journaling events, corresponding to segments 1, 2, and 3 for all of block 231's metadata M1 to be reflected in second L2P mapping table 220.

Similarly, closing of blocks 232, 233, 234, and 235 also lead to journaling events marked by lines 211. Because journaling happens in a round-robin fashion, these journaling events correspond to updates of segments 1, 2, 3, and 0 respectively. Segment 1, when updated upon the closure of block 232, updates M1+M2 data corresponding to segment 1, and so on. When block 234 is closed and a journaling event occurs for segment 3, update of M1 into second L2P mapping table 220 is complete, and segment 3 of second L2P mapping table 220 includes metadata M4 corresponding to segment 3 of L2P mapping table 245. When block 235 is closed and a journaling event occurs, update of M2 into second mapping table 220 is complete, whereas segment 0 of second L2P mapping table 220 includes metadata M5 corresponding to segment 0 of second L2P mapping table 245, and so on. Hence, as data is being written to open block 236 as shown in FIG. 2, journal event marked by line 212 represents the last block whose metadata is completely updated in second L2P mapping table 220. Blocks 233, 234, and 235 have their metadata M3, M4, and M5 updated partially in second L2P mapping table 220 when open block 236 is being written to. However, unless metadata is updated in all segments of second L2P mapping table 220, the update may not be useful.

Figure 4:
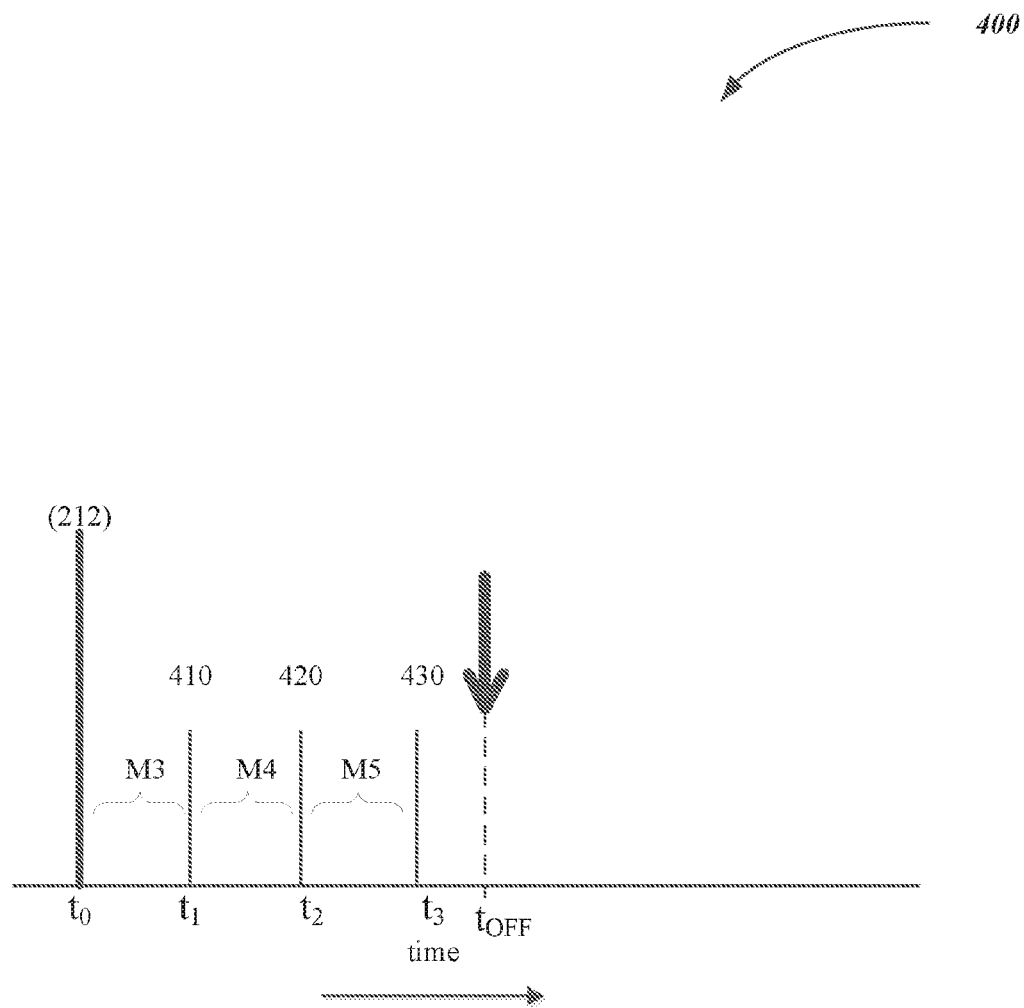
FIG. 4 is simplified illustration of the progress of journaling events, according to some implementations.

Timeline 400 of FIG. 4 re-iterates the journaling events following journal event marked by line 212. As mentioned previously, at the end of journal event marked by line 212, block 232's metadata M2 is completely updated in second L2P mapping table 220. Events between time $t_0$ and $t_{OFF}$ (where a power loss event occurs) can be referred to as a 'dirty window' and may need to be replayed on startup from a power loss event to rebuild an updated L2P mapping table.

As shown in FIG. 4, between time $t_0$ and $t_1$, block 233 is written and closed. Metadata M3 corresponding to block 233 is written to block 233, for example, in one or more of its 'metapages'. The journaling event 410 at $t_1$ updates segment 2 of second L2P mapping table 220 based on information in segment 2 of L2P mapping table 245. After journaling event 410 at $t_1$, metadata M3 corresponding to segment 2 is reflected in second L2P mapping table 220; however, metadata M3 data corresponding to other segments (0, 1, and 3) is not reflected in second L2P mapping table 220 at $t_1$. Indeed, although metadata M3 eventually gets reflected in segments 3 and 0 at $t_2$ and $t_3$ respectively, metadata M3 is not completely updated in second L2P mapping table 220 (i.e. never reflected in all segments of second L2P mapping table 220) at $t_{OFF}$ because it does not get reflected in segment 1 of second L2P mapping table 220 at $t_{OFF}$.

Similarly, the journaling event 420 at $t_2$ updates segment 3 of second L2P mapping table 220 based on information in segment 3 of L2P mapping table 245. After journaling event 420 at $t_2$, metadata M4 corresponding to segment 3 is reflected in second L2P mapping table 220; however, metadata M4 corresponding to other segments (0, 1, and 2) is not reflected in second L2P mapping table 220 at $t_2$. After journaling event 420, metadata M3 corresponding to segment 3 of L2P mapping table 245 is reflected in second L2P mapping table 220.

The journaling event 430 at $t_3$ updates segment 0 of second L2P mapping table 220 based on information in segment 0 of L2P mapping table 245. After journaling event 430 at $t_2$, metadata M5 corresponding to segment 0 is reflected in second L2P mapping table 220; however, metadata M5 corresponding to other segments (1, 2, and 3) is not reflected in second L2P mapping table 220 at $t_3$. After journaling event 430, metadata M3 corresponding to segment 0 of L2P mapping table 245 is reflected in second L2P mapping table 220; and metadata M4 corresponding to segment 0 of L2P mapping table 245 is reflected in second L2P mapping table 220.

A power loss event occurs at $t_{OFF}$. At $t_{OFF}$, M3, M4, and M5 are not completely reflected in second L2P mapping table 220. Hence, in the embodiment explained in FIGS. 2 and 4, M3, M4, and M5 would need to be replayed upon restart of the flash memory device to rebuild an updated L2P mapping table. The window between $t_0$ and $t_{OFF}$ can be referred to as the 'dirty window' and include commands (write and invalidation) that need to be replayed.

In the example illustrated above, the number of commands in the dirty window can be variable. For example, metadata M4 (or M3 or M5) above can include a very large number of invalidation (e.g. trim) commands. This can make rebuilding an updated L2P mapping table slow because these invalidation commands in metadata M4 are part of the dirty window, and have to be replayed on restart to rebuild an updated L2P mapping table. This can increase the rebuild time and SPOR time beyond what is allowed per requirements. The number of commands in the dirty window is also variable, and hence rebuild time and/or SPOR time can be variable and/or unpredictable. Using the method illustrated in FIGS. 2 and 4, it can be difficult or impossible to predict whether the rebuild time stays under a maximum allowed rebuild time. In other words, it may not be possible to meet a maximum rebuild time requirement in a specification.

Figure 5:
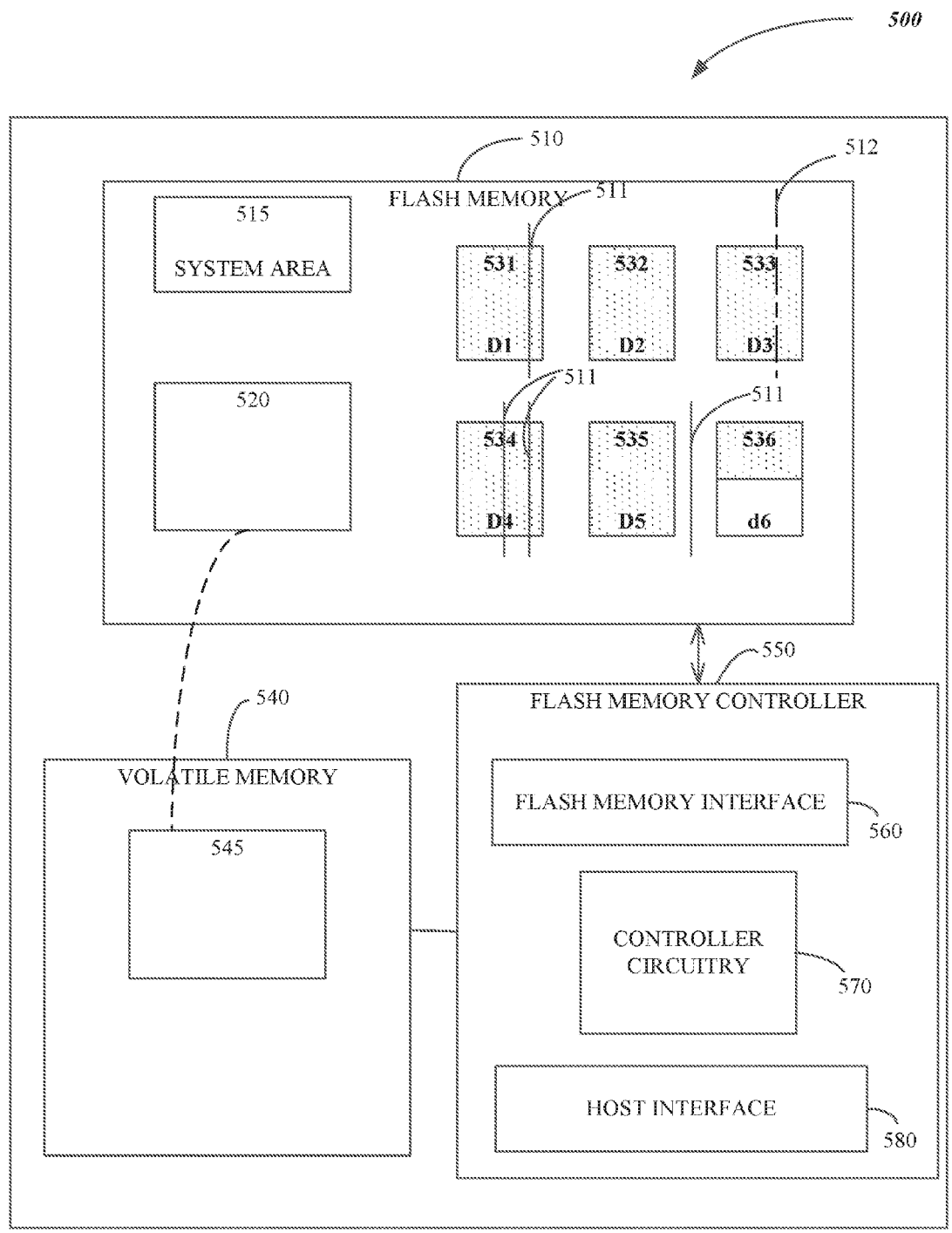
FIG. 5 is a simplified block diagram illustrating a flash memory device according to some embodiments.

FIG. 5 is a simplified block diagram illustrating a flash memory device 500 according to some embodiments. As shown in FIG. 5, flash memory device 500 can be similar to flash memory device 210 and includes a flash memory 510. In some embodiments, flash memory 510 can be a NAND flash memory, i.e., one based on NAND flash architecture.

In some embodiments, flash memory 510 can include a plurality of N-level cells, each N-level cell storing N bits of data. Flash memory 510 can also include a system area 515. In some embodiments, system area 515 can be used to store data in open blocks upon sudden loss of power to flash memory device 500. In examples, charge stored in a supercapacitor can be used to copy or move data in open blocks to system area 515 upon loss of power.

As shown in FIG. 5, flash memory 510 can include a second logical-address-to-physical-address mapping table ("second L2P mapping table") 520, and a plurality of blocks such as blocks 531, 532, 533, 534, 535, and 536. One or more of the plurality of blocks can be partially or fully filled with data. Additionally, blocks 531, 532, 533, 534, 535, and 536, as shown, also comprise metadata D1, D2, D3, D4, D5, and d6 respectively. At the instant shown in FIG. 5, for example at a power-loss event, data operations on blocks 531-535 have been complete, and they are hence 'closed' blocks. Block 536 is an open block, with partial data d6 recorded at the time of power loss.

Flash memory device 500 can also include a flash memory controller 550. In examples, flash memory controller 550 can include controller circuitry 570, a host interface 580, and a flash memory interface 560. Flash memory interface 560 can include elements (e.g., hardware, software, firmware or any combination thereof) necessary for supporting a flash memory interface protocol.

Controller circuitry 570 can refer to any processing logic, including but not limited to a processor or processing core associated with a processor, Application Specific Integrated Circuit (ASIC), Field Programmable Gate Array (FPGA), or any other circuitry configurable to execute instructions.

Host interface 580 can be used to communicate with a host, such as host 110 of FIG. 1. Host interface 580 can include elements (e.g., hardware, software, firmware or any combination thereof) necessary for supporting a host interface protocol.

As shown in FIG. 5, flash memory device 500 can further include a volatile memory 540. In embodiments, volatile memory 540 can include a DRAM, a Double Data Rate DRAM (DDR DRAM), a Static RAM (SRAM), and/or other volatile memory. In general, the volatile memory can refer to any memory media where the stored data is lost in the absence of continuous or substantially continuous power supply. Volatile memory 540 includes a logical-address-to-physical-address mapping table ("L2P mapping table") 545. L2P mapping table 545 is updated as controller 550 receives commands from a host.

According to embodiments, controller circuitry 570 can be configured to interact with volatile memory 540 and flash memory 510 to update second L2P mapping table 520 based on L2P mapping table 545 through journaling events. Controller circuitry 570 can be configured to implement one or more methods described below. In implementations, second L2P mapping table 520 and L2P mapping table 545 can be divided into a number of segments (e.g. n).

An example of the division of second L2P mapping table 520 resident in flash memory 510, and L2P mapping table 545 resident in volatile memory 540, into segments as part of the journaling process was illustrated in conjunction with mapping tables 220 and 245, in FIG. 3. Similar to what was shown in FIG. 3, L2P mapping table 545 and second L2P mapping table 520 can be divided into four segments 0-3. However, embodiments are not limited to such a number, and in general, the mapping tables can be divided into 'n' segments.

In some embodiments, an estimated time to rebuild ($\hat{T}$) can be continually maintained and computed. In some examples, the estimated time to rebuild can be maintained in flash memory controller 550 and can be updated every time a command is received from the host. In other examples, the estimated time to rebuild can be updated once after a certain number of commands are received from the host. A journaling event can occur whenever the estimated time to rebuild equals or exceeds a threshold value. In some embodiments, the threshold value can be based on a maximum allowed rebuild time, for example, to meet specification. For example, the threshold value can be the maximum permissible rebuild time to meet a specification, minus an allowance time. Because journaling events are based estimated rebuild time and not on closing of blocks (e.g. not based on x-block writes), a journaling event may not coincide with the closing of a block.

A journaling event results in one segment of L2P mapping table 545 being updated to the corresponding segment of second L2P mapping table 520. For example, upon closing of a block and writing of P2L information corresponding to that block in a meta-page of that block, segment 0 of L2P mapping table 545 is updated to segment 0 of second L2P mapping table 520. As before, it should be noted that, after a journaling event, not all updated information from L2P mapping table 545 is reflected in second L2P mapping table 520. For example, following a segment 0 journaling event, segments 1, 2, and 3 of second mapping table 520 may not yet contain up-to-date data.

Now, according to some embodiments, an example of the journaling process will be described with reference to flash memory device 500 of FIG. 5 and timeline 600 of FIG. 6.

At a point in time before the state shown in FIG. 5, the plurality of blocks 531-536 of flash memory 510 are empty. An estimated rebuild time $\hat{T}$ is calculated and/or estimated continually as commands are received from the host. This estimated rebuild time can be maintained, for example, in flash memory controller 550. In some embodiments, $\hat{T}$ can be updated every time a command comes in from the host. In other implementations, $\hat{T}$ can be updated once every certain number of commands (e.g. once every 10 or once every 100 commands).

In some embodiments, estimated rebuild time $\hat{T}$ can be calculated as the total time to at least (1) read the dirty second L2P mapping table 520 from flash memory 510; (2) replay and update P2L information from a dirty window; and (3) to read and update open block information from system area 515. When $\hat{T}$ equals or exceeds a threshold value, a journaling event can be triggered.

Journaling events marked by lines 511 illustrate journaling events that occurred in flash memory device 500. The lines corresponding to journaling events marked by lines 511 are for illustrative purposes and generally meant to indicate the approximate fraction of a block that was written when a journaling event occurred. As indicated in FIG. 5, journaling events marked by lines 511 can occur while the process of writing to a block is still ongoing.

When a journaling event occurs before an open block is closed, the metadata corresponding that block is divided among more than one journal interval, where a journal interval is defined as the interval between two successive journal events. For example, as shown in FIG. 5, metadata D1 corresponding to block 531 is divided into $D1_1$ and $D1_2$; metadata corresponding to D2 falls fully within one journal interval; metadata D3 is divided into $D3_1$ and $D3_2$; metadata D4 is divided into $D4_1$, $D4_2$, and $D4_3$; metadata D5 falls fully within one journal interval. These divisions, although not labelled in FIG. 5 are referred to in FIG. 6. Because of the rationale behind trigger a journal event, the replay time on startup for each of the journal intervals may all be approximately the same.

As explained previously in conjunction with FIGS. 2 and 3, at each journal event marked by line 511, a segment of L2P mapping table 545 is updated to the segment of second L2P mapping table 520. As explained previously, as data is being written to open block 536 as shown in FIG. 5, journal event marked by line 512 represents the last journal event before which metadata is completely updated in second L2P mapping table 520. Part of block 533, and blocks 534, and 535 have their metadata $D3_2$, $D4_1$, $D4_2$, and $D4_3$, and D5 updated only partially in second L2P mapping table 520 when open block 536 is being written to. However, such partially updated metadata in second L2P mapping table 520 may not be useful and the metadata may need to be replayed. Lines 511 and 512 are only schematic, used to indicate progress through a block when a journaling event occurs, are not meant to indicate physical partitions of blocks.

Figure 6:
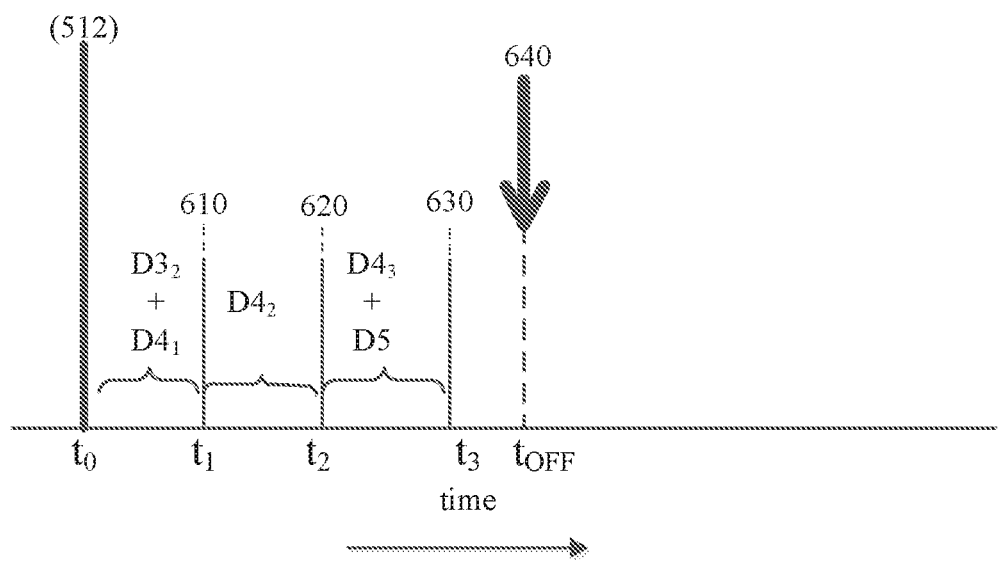
FIG. 6 is simplified illustration of the progress of journaling events, according to some embodiments.

Timeline 600 of FIG. 6 re-iterates the journaling events following journal event marked by line 512. Time labels used in FIG. 6 do not necessary correspond to the same times described in other figures. As mentioned previously, at the end of journal event marked by line 512 ($t_0$), all metadata prior to journal event marked by line 512 is completely updated in second L2P mapping table 520. Events between time $t_0$ and $t_{OFF}$ (where a power loss event occurs) can be referred to as a 'dirty window' and may need to be replayed on startup from a power loss event to rebuild an updated L2P mapping table.

As shown in FIG. 6, between time $t_0$ and $t_1$, metadata $D3_2$ corresponding to block 533 is written to block 533, for example, in one or more of its 'metapages'; and metadata $D4_1$ corresponding to block 534 is written to block 534. The journaling event 610 at $t_1$ updates segment 2 of second L2P mapping table 520 based on information in segment 2 of L2P mapping table 545. After journaling event 610 at $t_1$, metadata $D3_2$ and $D4_1$ corresponding to segment 2 are reflected in second L2P mapping table 520; however, metadata $D3_2$ and $D4_1$ data corresponding to other segments (0, 1, and 3) are not reflected in second L2P mapping table 520 at $t_1$. Indeed, although metadata $D3_2$ and $D4_1$ eventually get reflected in segments 3 and 0 at $t_2$ and $t_3$ respectively, metadata $D3_2$ and $D4_1$ are not completely updated in second L2P mapping table 520 (i.e. never reflected in all segments of second L2P mapping table 520) at $t_{OFF}$ because they do not get reflected in segment 1 of second L2P mapping table 520 at $t_{OFF}$.

Similarly, the journaling event 620 at $t_2$ updates segment 3 of second L2P mapping table 520 based on information in segment 3 of L2P mapping table 545. After journaling event 620 at $t_2$, metadata $D4_2$ corresponding to segment 3 is reflected in second L2P mapping table 520; however, metadata $D4_2$ corresponding to other segments (0, 1, and 2) is not reflected in second L2P mapping table 520 at $t_2$. After journaling event 620, metadata $D3_2$ and $D4_1$ corresponding to segment 3 of L2P mapping table 545 is reflected in second L2P mapping table 520.

The journaling event 630 at $t_3$ updates segment 0 of second L2P mapping table 520 based on information in segment 0 of L2P mapping table 545. After journaling event 630 at $t_2$, metadata $D4_3$ and D5 corresponding to segment 0 are reflected in second L2P mapping table 520; however, metadata $D4_3$ and D5 corresponding to other segments (1, 2, and 3) are not reflected in second L2P mapping table 520 at $t_3$. After journaling event 630, metadata $D3_2$ and $D4_1$ corresponding to segment 0 of L2P mapping table 545 is reflected in second L2P mapping table 520; and metadata $D4_2$ corresponding to segment 0 of L2P mapping table 545 is reflected in second L2P mapping table 520.

A power loss event occurs at $t_{OFF}$. At $t_{OFF}$, $D3_2$, D4, and D5 are not completely reflected in second L2P mapping table 520. Hence, in the embodiment explained in FIGS. 2 and 4, $D3_2$, D4 ($D4_1+D4_2+D4_3$), and D5 would need to be replayed upon restart of the flash memory device to rebuild an updated L2P mapping table. The window between $t_0$ and $t_{OFF}$ can be referred to as the 'dirty window' and include commands (write and invalidation) that need to be replayed.

In the example illustrated in FIGS. 5 and 6, a journaling event is triggered based on the estimated rebuild time exceeding a threshold value. The estimated rebuild time varies based on the replay time of the dirty window. The replay time of the dirty window in turn depends on the number of commands (write and trim) in the dirty window and the replay time for each command. When the estimated rebuild time reaches the threshold value, a journaling event is triggered, thereby reducing the estimated rebuild time.

Hence, in the embodiments described in FIGS. 5 and 6, journaling events can be triggered more frequently when metadata includes a large number of trim commands so as to keep the estimated rebuild time under a limit. In this way, the replay time of the dirty window can be kept under control, and hence rebuilding an updated L2P mapping table upon restart can be designed to fall within requirements.

Upon restart following power off at $t_{OFF}$, data in volatile memory 540 is lost. An L2P mapping table can be rebuilt in volatile memory 540. To build such an L2P mapping table, the out-of-date (i.e. dirty) second L2P can be copied over to an L2P mapping table in volatile memory 540. This L2P mapping table in volatile memory 540 can be updated by replaying required P2L metadata present in metapages of blocks. Metadata required to be replayed can be determined based on the last journaling event that completely updated a set of metadata in all segments.

Figure 7:
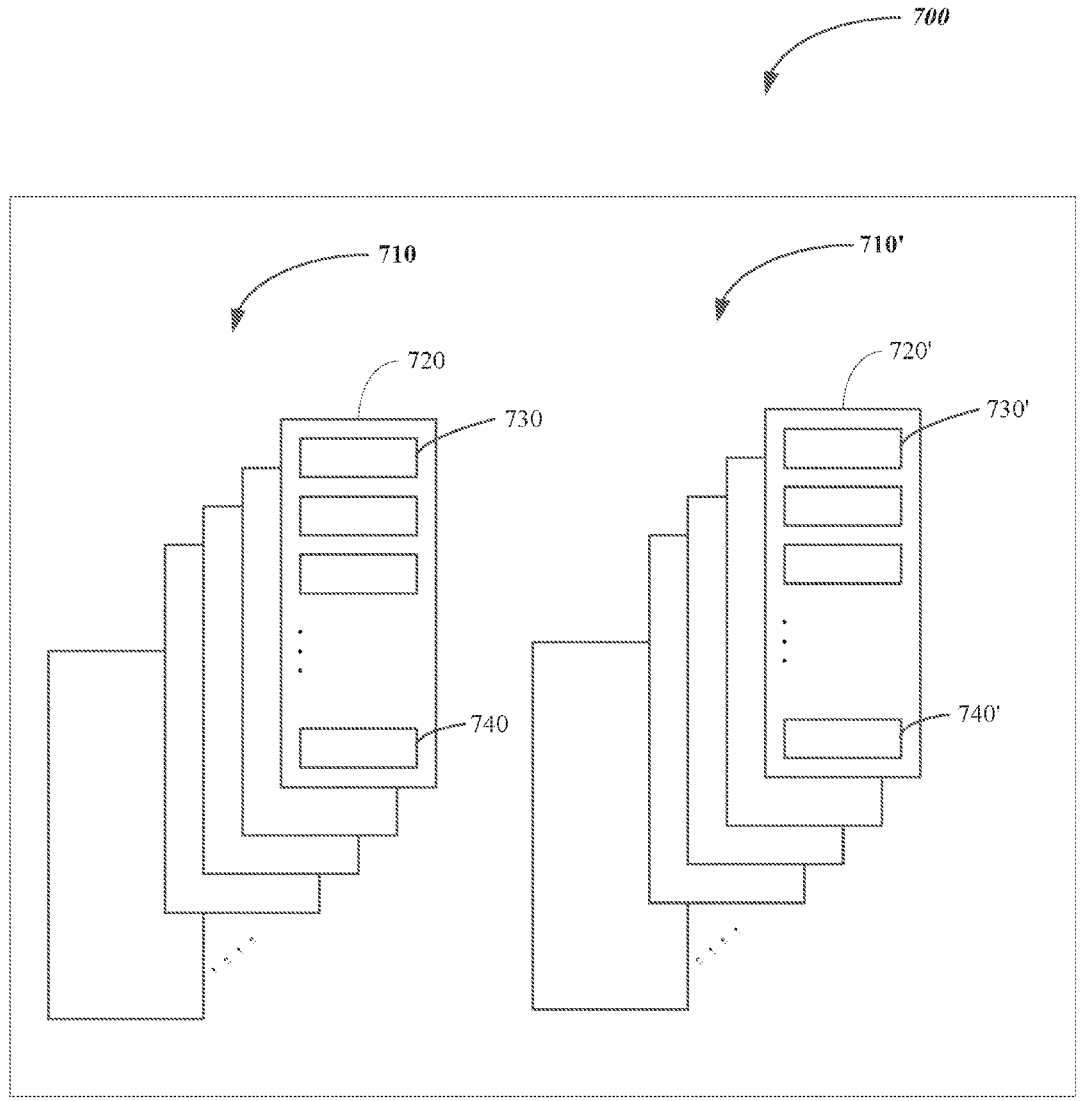
FIG. 7 is a simplified illustration of the organization of an example non-volatile memory die, according to embodiments.

FIG. 7 is a simplified illustration of the organization of an example flash memory 130, according to embodiments. It is to be noted that the structure shown in FIG. 7 is for illustrative purposes only and the actual physical organization of the flash memory can differ substantially from the depiction.

In the example shown in FIG. 7, flash memory die 700 comprises two planes 710 and 710'. Other examples can include a different number of planes per die. A plurality of such dies can be included in a flash memory, such as flash memory 130. Plane 710 can comprise a plurality of blocks, such as block 720. Plane 710' can include a plurality of blocks, such as block 720'. Block 720 can further comprise a plurality of pages 730. A page, such as page 730, may share a common word-line and can represent a minimum programmable unit. A page can also represent the minimum readable unit. A block can represent the smallest erasable unit.

Dies such as flash memory die 700 can be organized using different channels. Each channel can have multiple dies attached to it. For example, the first block from the first die, the first block from the second die, the first block from the third die, and so on, can be grouped together and accessed in parallel, thereby forming a superblock. Pages belonging to the same superblock can be, for example, programmed and read in parallel. Although a superblock may not be physically grouped in a unit, logically, a superblock can behave as a block.

In example, flash memory devices, program and erase operations take place at a 'page' level, while blocks can represent the smallest unit that can be erased. When data in an existing page has to be updated, the entire block has to be erased before the updated data is reprogrammed. In these flash memory devices, the system can reserve a certain number of free blocks to be used when an update request, i.e., a new program request, is received.

Figure 8:
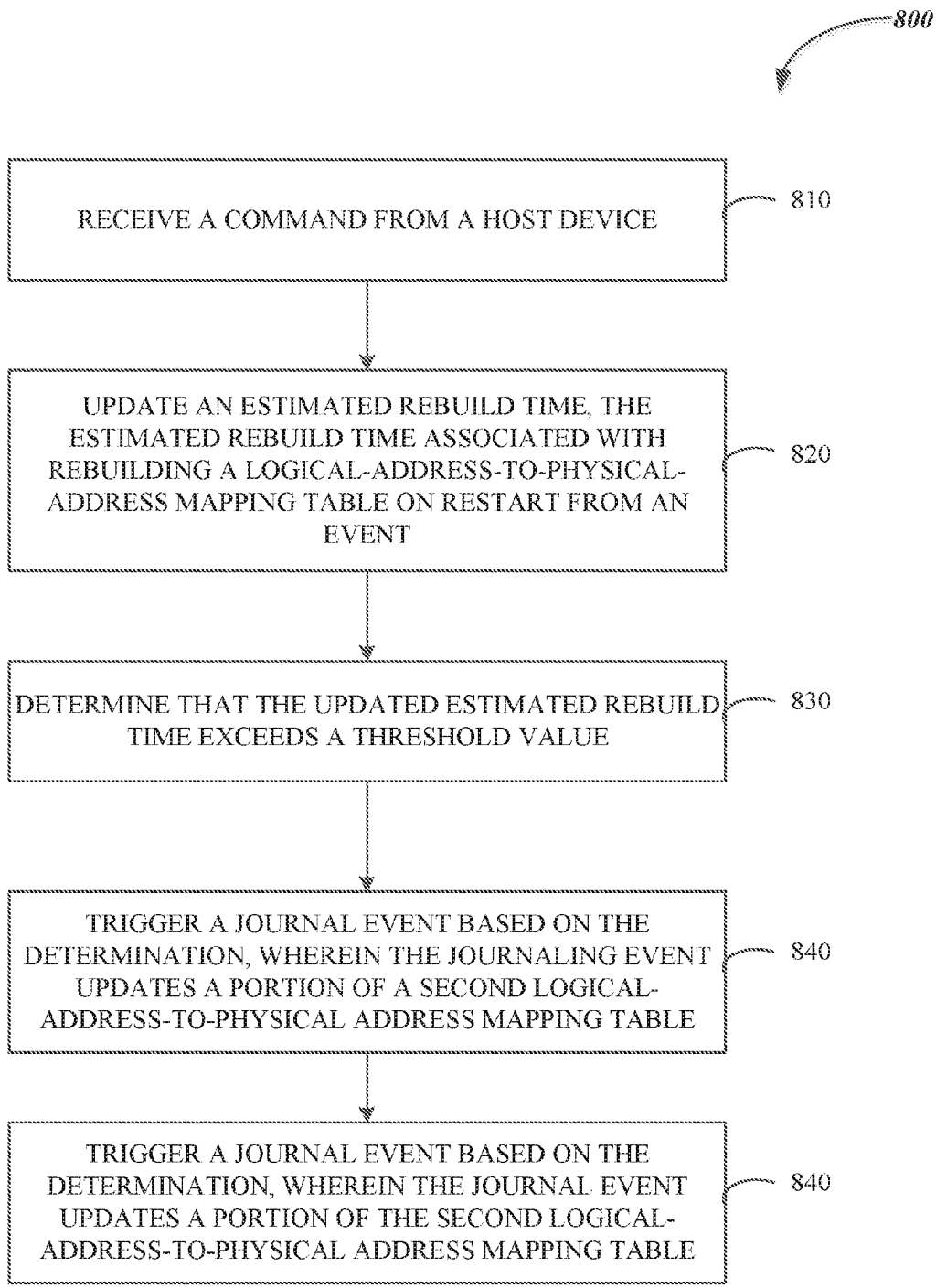
FIG. 8 is a flowchart illustrating a method in a flash memory device, according to embodiments.

FIG. 8 is a flowchart illustrating a process 800 in a flash memory device, according to embodiments. One example where process 800 can be applied is in a NAND flash memory. Although process 800 may be explained below as it is performed by flash memory device 500, and in some instances flash memory controller 550, of FIG. 5, it should be noted that other systems and apparatus can be used in place of flash memory device 500 to perform process 800 and other processes described in the disclosure.

At step 810, process 800 includes receiving a command from a host device. In implementations, step 810 can be performed by flash memory controller 550 of FIG. 5. Examples of commands received can include a write or program command, or an invalidation command such as delete or trim. The command received can be one of a plurality of commands. In some embodiments, the plurality of commands can include a plurality of trim commands.

At step 820, process 800 includes updating an estimated rebuild time, the estimated rebuild time associated with rebuilding a logical-address-to-physical-address mapping table on restart from an event. In examples, the logical-address-to-physical-address mapping table can refer to an L2P mapping table that is built in a volatile memory accessible to the flash memory controller upon restart of the flash memory device from a power-loss event. In some embodiments, the L2P mapping table can be rebuilt based on: (1) an out-of-date i.e. 'dirty' second mapping table in the non-volatile memory, (2) P2L metadata in blocks of the non-volatile memory, and (3) open block data at power loss accessible from the non-volatile memory. In some embodiments, open block data at power loss can be written to and present as recovery data in a system area of the non-volatile memory.

In some embodiments, the estimated rebuild time can include at least: (1) a copy time associated with copying information stored in a second logical-address-to-physical-address mapping table to the logical-address-to-physical-address mapping table; and (2) a replay time of a plurality of commands, the plurality of commands including the command. In some embodiments, the estimated rebuild time can also include the time taken for open block scan. In some embodiments, the logical-address-to-physical-address mapping table and the second logical-address-to-physical-address mapping table are associated with a flash translation layer.

At step 830, process 800 includes determining that the updated estimated rebuild time exceeds a threshold value. In some embodiments, the threshold value can be related to the maximum permissible rebuild time, for example, to meet a specification. For instance, the threshold value can be the maximum permissible rebuild time minus a tolerance value.

At step 840, process 800 includes triggering a journal event based on the determination of step 830. The journal event can update a portion of the second logical-address-to-physical-address mapping table. For example the journal event can update one segment of the second logical-address-to-physical-address mapping table.

The journaling event at step 840 reduces the estimated rebuild time. In some embodiments, the reduction in the estimated rebuild time corresponds to the replay time of a journal interval following the restart from the event. The journal interval can comprise a plurality of commands to be replayed. In some embodiments, process 800 can further include determining that the reduced updated estimated rebuild time is below the threshold value.

Figure 9:
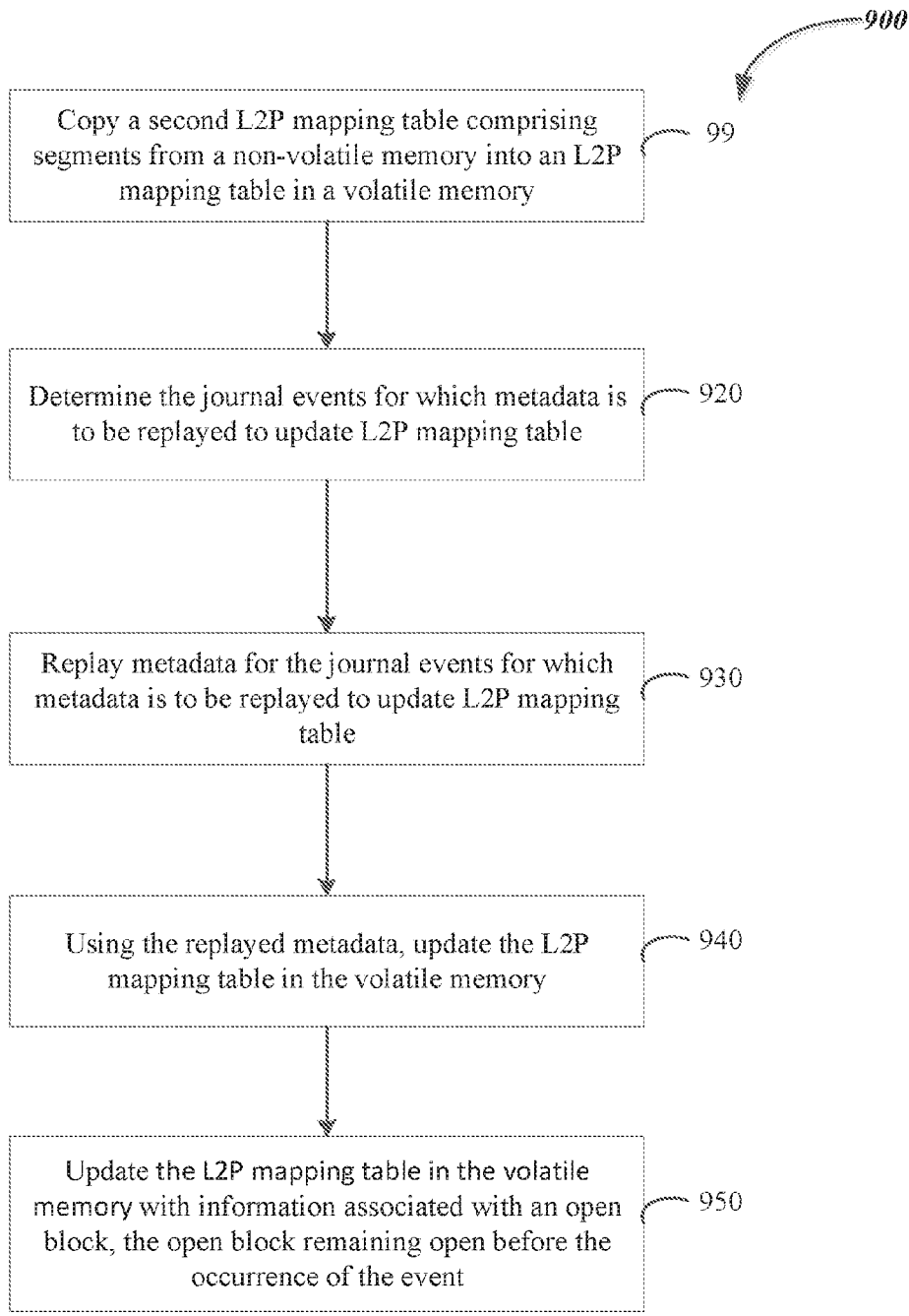
FIG. 9 is a flowchart illustrating another method in a flash memory device, according to embodiments.

FIG. 9 is a flowchart illustrating a process 900 in a flash memory device, according to embodiments. In some embodiments, process 900 occurs upon restart from an event such as a sudden power loss event. If power is lost during the operation of a flash memory device, there may not be sufficient time to write an up-to-date copy of the logical-address-to-physical address (L2P) mapping table from the volatile memory (e.g. DRAM) to the non-volatile memory (e.g. NAND flash memory). Hence, on restart, an up-to-date L2P mapping table is constructed or rebuilt from the dirty L2P mapping table (referred to as the 'second L2P mapping table in process 900) in the non-volatile memory, using at least metadata information in the non-volatile memory. Process 900 can be used for such a rebuild.

At step 910, process 900 includes copying a second L2P mapping table from a non-volatile memory to an L2P mapping table in the volatile memory. The L2P mapping table and second L2P mapping table can comprise segments, such as those described in FIG. 3. Previously, these segments may have been used for a journaling process before loss of power.

At step 920, process 900 includes determining the journal events for which metadata is to be replayed to update the L2P mapping table. The journal events refer to the journal events that occurred before the power loss event. In some examples, this determination can involve stepping back 'n' journal events before the power loss event, where 'n' refers to the number of segments in the second L2P mapping table. This can lead to the point beyond which metadata should to be replayed. In other words, the dirty window can hence be determined. An example of this calculation was provided in connection with FIGS. 2, 4, 5, and 6.

At step 930, process 900 includes replaying metadata for the journal events for which metadata is to be replayed to update L2P mapping table. In other words, step 930 can include replaying metadata from the dirty window. At step 940, using the replayed metadata, L2P mapping table in the volatile memory is updated. In some embodiments, step 940 can occur simultaneously with step 930.

At step 950, the L2P mapping table is updated with information from an open block. An open block can refer to a block that was 'open' (i.e. being written to or otherwise being modified) when the power loss event happened. In some embodiments, step 950 can involve accessing information from a system area of the non-volatile memory. In some embodiments, step 950 can be optional.

Further specific examples of methods of journaling will be described below, according to some embodiments. In these examples, the max rebuild latency allowed is represented by $T_{max}$, the dirty table read time is $T_a$, open block scan time is $T_b$. So the total amount of time left for P2L metadata read and replay is $T_{max}-T_a-T_b$. This can be associated with a threshold time $T_{thr}$ allowing for an optional leeway. In other words, $T_{thr}=T_{max}-T_a-T_b-\Delta$ This $T_{thr}$ can be compared to the estimated rebuild time $\tilde{T}$ continually in process 1000. In one example, each metadata entry (i.e. each P2L entry), records a host command of length 64 bits. In examples, such a host command can be a write command, or it can be a trim command with range size r. Assuming the replay time for a host write command is $t_h$ seconds and replaying a trim command with range size r is $t_r(r)$, the accumulated P2L page read time and replay time can be calculated by summing $t_h$ and $t_r(r)$ for all commands received.

This way, P2L metadata read and replay time for a journal interval 'i' can be calculated as w(i). where a journal interval is defined as the time window between two adjacent table journal events. In the example, i=0 for current interval (between last journaling event and current time) and i increases by 1 when we move the interval back in time by 1. The total estimated rebuild time will be $$\tilde{T} = \sum_{i=0}^{n} w(i).$$

Upon completion of a journal event, w(n) can effectively be removed from the sum, thereby reducing estimated rebuild time. Once it is determined that $\tilde{T}$ has reached a threshold time $T_{thr}$, a journaling event can be triggered.

Figure 10:
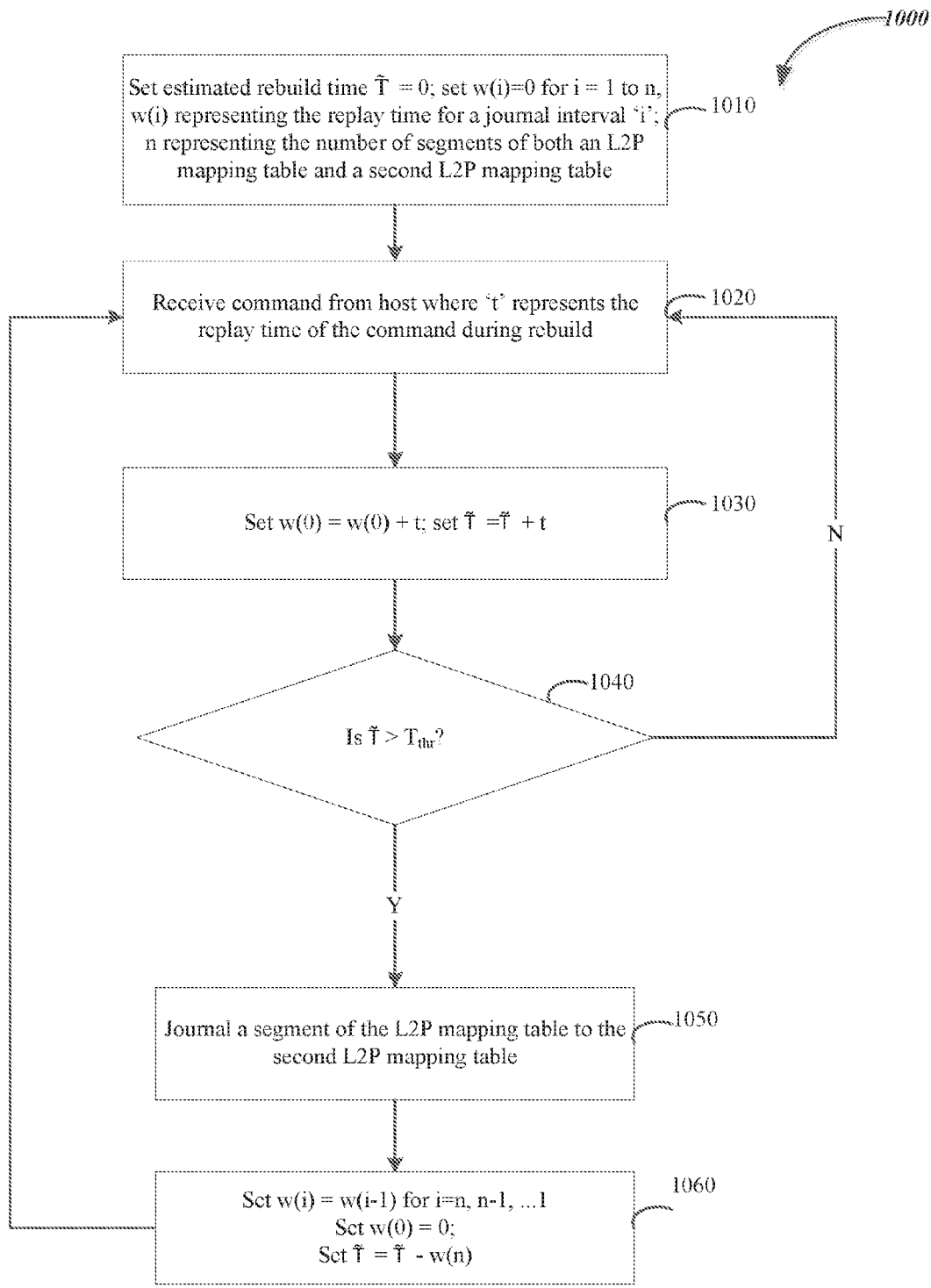
FIG. 10 is a flowchart illustrating another method in a flash memory device, according to embodiments.

FIG. 10 is a flowchart illustrating a process 1000 in a flash memory device, according to embodiments. At step 1010, estimated rebuild time $\tilde{T}$ is set to be =0 when power is up. Also, w(i) is set to be =0 for i=0, 1, 2, . . . , n where n represents the number of segments in an L2P mapping table in a volatile memory, which is equal to the number of segments in a second L2P mapping table in a non-volatile memory.

At step, 1020, process 1000 includes receiving a command whose replay time is 't', from a host. In examples, the command can be a host write command or trim command. At step 1030, process 1000 includes setting w(0)=w(0)+t, where t=$t_h$ for a host write command and t=$t_r(r)$ for a trim command. Step 1020 also includes updating $\tilde{T}=\tilde{T}+t$.

At step 1040, process 1000 includes determining whether $\tilde{T}$ is greater than $T_{thr}$. If $\tilde{T}$ is greater than $T_{thr}$, process 1000 proceeds back to step 1020. If $\tilde{T}$ is not greater than $T_{thr}$, process 1000 proceeds to step 1050.

At step 1050, process 1000 includes a journal event. The journal event journals a segment of the L2P mapping table in the volatile memory to the corresponding segment of the second L2P mapping table in the non-volatile memory.

At step 1060, process 1000 includes setting w(i)=w(i−1), i=n, n−1, . . . , 1; setting w(0)=0; and setting $\tilde{T}=\tilde{T}-w(n)$. In some embodiments, if $\tilde{T}$ is not greater than $T_{thr}$, step 1060 can be repeated until $\tilde{T}$ is not greater than $T_{thr}$. Process 1000 can then proceed to step 1020 when $\tilde{T} \leq T_{thr}$.

It is noted that, in some embodiments, that journaling of a table segment can be done in a way that the table and user data are interleaved. In this way, the Quality of Service (QoS) impact to host command can be smaller. Also, as mentioned, estimating $\tilde{T}$ and w(i) for every command can be costly. So, in some embodiments, the update can also be done after certain number of commands being processed. For example, these numbers can be updated after every 10 commands. When journaling events occur, certain percentage of host write bandwidth is consumed by table segment write traffic. This causes increase to the latency. To reduce the latency, in certain instances, it is better to distribute the table segment write commands among the host write commands, so that host commands have the opportunity to be serviced.

Figure 11:
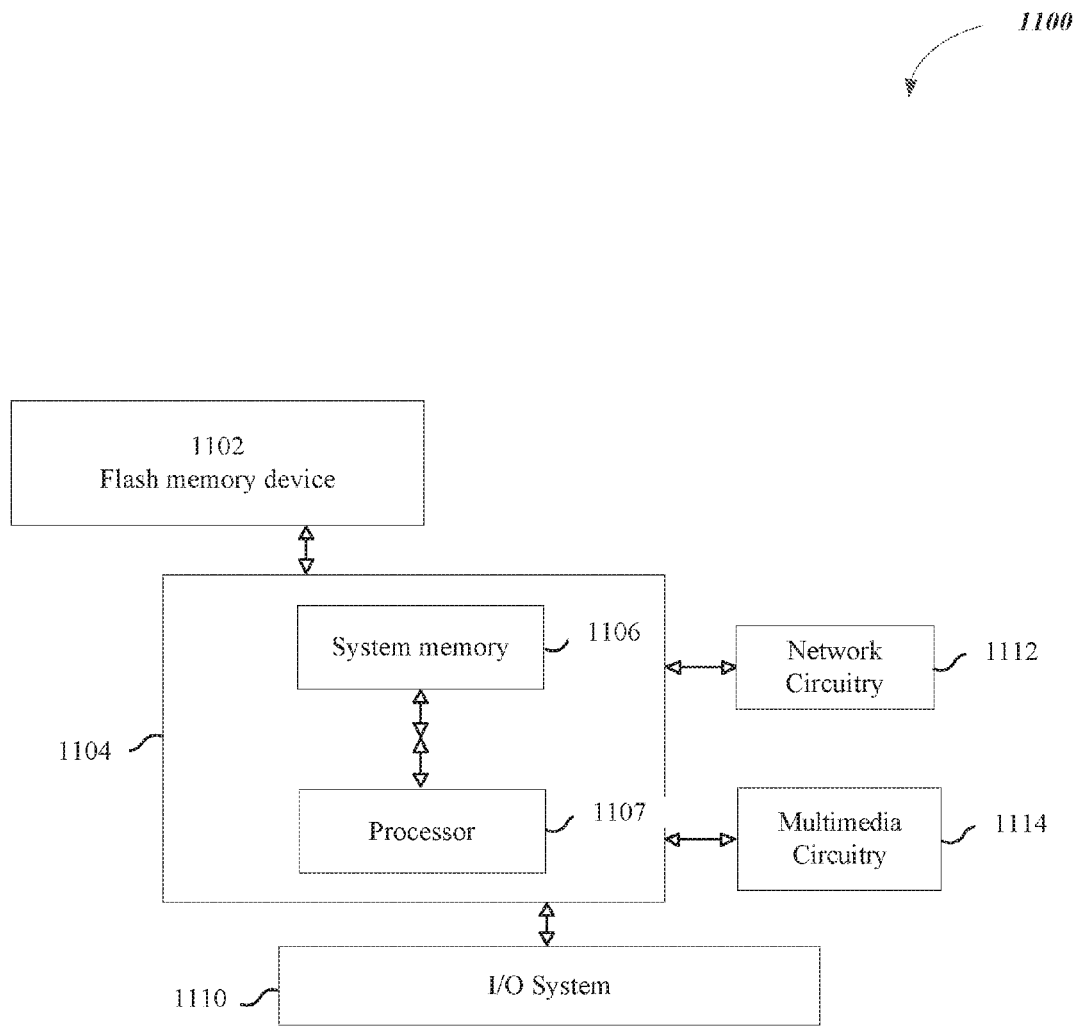
FIG. 11 is a simplified illustration of a computer device comprising an embodiment.

FIG. 11 illustrates an example computing device 1100 comprising embodiments of the invention. Hardware elements of device 1100 can be electrically coupled via a bus (or may otherwise be in communication, as appropriate). As shown in FIG. 11, computing device 1100 includes processing unit 1004, flash memory device 1002, an input/output (I/O) system 1110, network circuitry 1112, and multimedia circuitry 1114. In the example depicted, processing unit 1104 can act as a host system.

In examples, flash memory device 1102 can be a NAND flash memory device such as flash memory device 500 of FIG. 5, and can be used to store secondary data accessed by processing unit 1104. Flash memory device 1102 can include a flash memory controller (not shown) according to embodiments described above, acting as an interface between non-volatile memory device 1102 and the processing unit 1104. System memory 1106 can be a volatile memory such as a Random Access Memory (RAM) and can operate in conjunction with processor 1108. Processor 1108 can include, without limitation, one or more general-purpose processors and/or one or more special-purpose processors (such as digital signal processing chips, graphics acceleration processors, and/or the like).

Computing device 1100 can further include network circuitry 1112 to connect computing device 1100 to a network. The network circuitry can include without limitation a modem, a network card (wireless or wired), an infrared communication device, a wireless communication device and/or chipset (such as a Bluetooth™ device, an 1602.11 device, a WiFi device, a WiMax device, cellular communication facilities, etc.), and/or the like. Network circuitry 1112 may permit data to be exchanged with a network, other devices, and/or any other devices described herein.

As shown in FIG. 11, computing device 1100 can include multimedia circuitry 1114. Multimedia circuitry 1114 can connect computing device 1100 to several external audio and video input and output, such as displays and speakers. I/O system 1110 can connect computing device 1100 to various input devices and mechanisms such as keyboards, mice, touchscreens, cameras, infra-red capture devices, and the like, and output devices and mechanisms such as a printer, a display unit, a haptic feedback device, and/or the like.

Computing device 1100 also can include software elements, located within system memory 1106 or in flash memory 1102, including device drivers, executable libraries, and/or other code, such as one or more application programs, which may include computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device such as flash memory controller 550 of FIG. 5) to perform one or more operations in accordance with the described methods, for example, any of the methods illustrated in FIGS. 8-10.

A set of these instructions and/or code might be stored on a computer-readable storage medium, such as within flash memory device 1102, or, in examples, within the flash memory controller in flash memory device 1102. In some cases, the storage medium might be incorporated within a device, such as device 1100 or flash memory device 1102. In other embodiments, the storage medium might be separate from a device (e.g., a removable medium, such as a compact disc), and/or provided in an installation package, such that the storage medium can be used to program, configure and/or adapt a general purpose computer with the instructions/code stored thereon. These instructions might take the form of executable code, which is executable by a device and/or might take the form of source and/or installable code, which, upon compilation and/or installation on a device (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

The terms "machine-readable medium" and "computer-readable medium," as used herein, refer to any medium that participates in providing data that causes a machine to operate in a specific fashion. While illustrative embodiments of the application have been described in detail herein, it is to be understood that the inventive concepts may be otherwise variously embodied and employed, and that the appended claims are intended to be construed to include such variations, except as limited by the prior art.

The embodiments disclosed herein are not to be limited in scope by the specific embodiments described herein. Various modifications of the embodiments of the present invention, in addition to those described herein, will be apparent to those of ordinary skill in the art from the foregoing description and accompanying drawings. Further, although some of the embodiments of the present invention have been described in the context of a particular implementation in a particular environment for a particular purpose, those of ordinary skill in the art will recognize that its usefulness is not limited thereto and that the embodiments of the present invention can be beneficially implemented in any number of environments for any number of purposes.

What is claimed is:

1. A non-volatile memory (NVM) controller configured to:
   receive a command from a host device;
   upon receiving the command, update an estimated rebuild time, the estimated rebuild time associated with rebuilding a logical-address-to-physical-address mapping table on restart from an event, the updated estimated rebuild time based on at least:
   a copy time associated with copying information stored in a second logical-address-to-physical-address mapping table to the logical-address-to-physical-address mapping table; and
   a replay time of a plurality of commands, the plurality of commands including the command;
   determine that the updated estimated rebuild time exceeds a threshold value;
   trigger a journaling event based on the determination, wherein the journaling event updates a portion of the second logical-address-to-physical address mapping table; and
   reduce the updated estimated rebuild time based on the journaling event.

2. The non-volatile memory controller of claim 1 wherein the reduction in the estimated rebuild time corresponds to the replay time of a journal interval following the restart from the event.

3. The non-volatile memory controller of claim 1, wherein the controller is further configured to determine that the reduced updated estimated rebuild time is below the threshold value.

4. The non-volatile memory controller of claim 1 wherein the logical-address-to-physical-address mapping table and the second logical-address-to-physical-address mapping table are associated with a flash translation layer.

5. The non-volatile memory controller of claim 1 wherein the plurality of commands comprise a plurality of trim commands.

6. The non-volatile memory controller of claim 1 wherein the second logical-address-to-physical-address mapping table is located in a non-volatile memory.

7. The non-volatile memory controller of claim 6 wherein the rebuilding is further based on physical to logical mapping data in the non-volatile memory and the rebuilding is further based on recovery data in a system area of the non-volatile memory.

8. The non-volatile memory controller of claim 1 wherein the event is a sudden power loss event.

9. The non-volatile memory controller of claim 6 wherein the logical-address-to-physical-address mapping table is located in a volatile memory accessible to the non-volatile memory.

10. The non-volatile memory controller of claim 1 wherein the portion of the second logical-address-to-physical address mapping table updated by the journaling event is a segment of the second logical-address-to-physical-address mapping table.

11. The non-volatile memory controller of claim 1 wherein the threshold value is related to the maximum permissible rebuild time to meet a specification.

12. A method comprising:
    receiving a command from a host device;
        upon receiving the command, updating an estimated rebuild time, the estimated rebuild time associated with rebuilding a logical-address-to-physical-address mapping table on restart from an event, the updated estimated rebuild time based on at least:
            a copy time associated with copying information stored in a second logical-address-to-physical-address mapping table to the logical-address-to-physical-address mapping table; and
            a replay time of a plurality of commands, the plurality of commands including the command;
        determining that the updated estimated rebuild time exceeds a threshold value;
        triggering a journaling event based on the determination, wherein the journaling event updates a portion of the second logical-address-to-physical address mapping table; and
        reducing the updated estimated rebuild time based on the journaling event.

13. The method of claim 12 wherein the reduction in the estimated rebuild time corresponds to the replay time of a journal interval following the restart from the event.

14. The method of claim 12 further comprising determining that the reduced updated estimated rebuild time is below the threshold value.

15. The method of claim 12 wherein the logical-address-to-physical-address mapping table and the second logical-address-to-physical-address mapping table are associated with a flash translation layer.

16. The method of claim 12 wherein the plurality of commands comprise a plurality of trim commands.

17. The method of claim 12 wherein the second logical-address-to-physical-address mapping table is located in a non-volatile memory.

18. The method of claim 12 wherein the rebuilding is further based on physical to logical mapping data in the non-volatile memory and the rebuilding is further based on recovery data in a system area of the non-volatile memory.

19. The method of claim 18 wherein the event is a sudden power loss event.

20. The method of claim 12 wherein the logical-address-to-physical-address mapping table is located in a volatile memory accessible to the non-volatile memory.

21. The method of claim 18 wherein the portion of the second logical-address-to-physical address mapping table updated by the journaling event is a segment of the second logical-address-to-physical-address mapping table.

22. The method of claim 12 wherein the threshold value is related to the maximum permissible rebuild time to meet a specification.

* * * * *